United States Patent Office 2,954,263
Patented Sept. 27, 1960

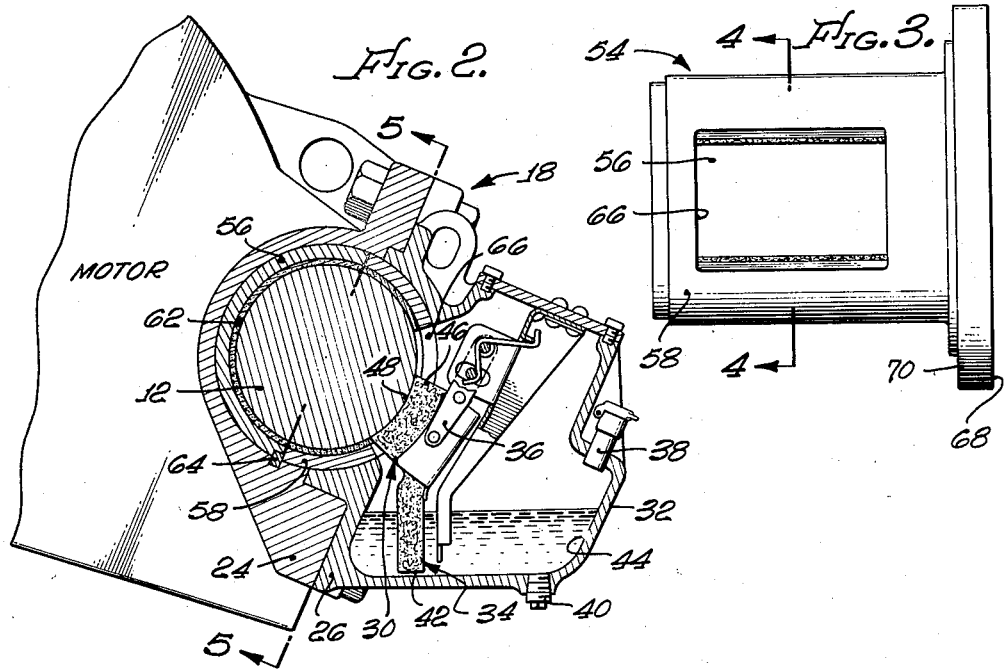
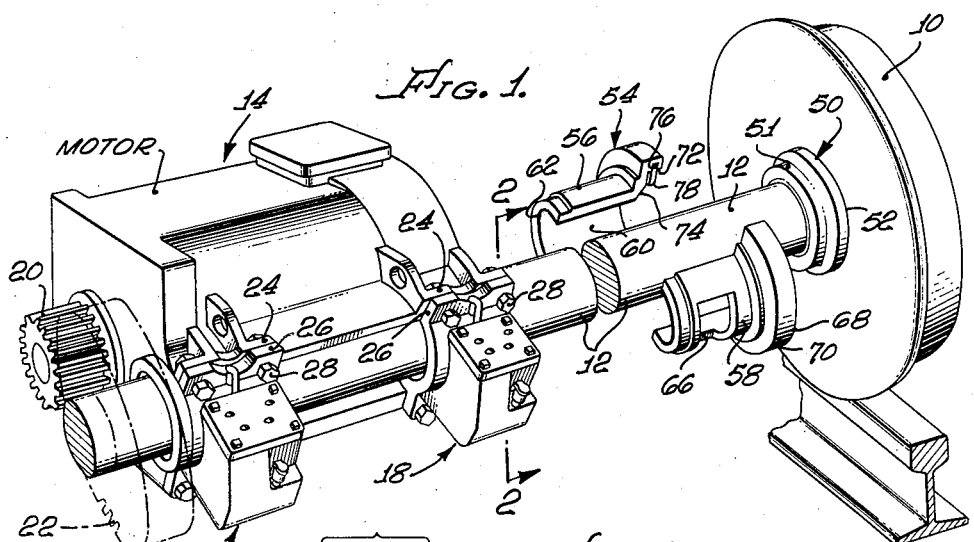
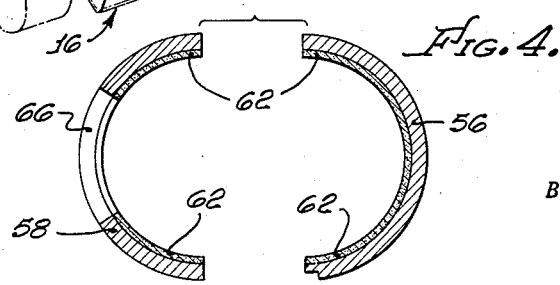

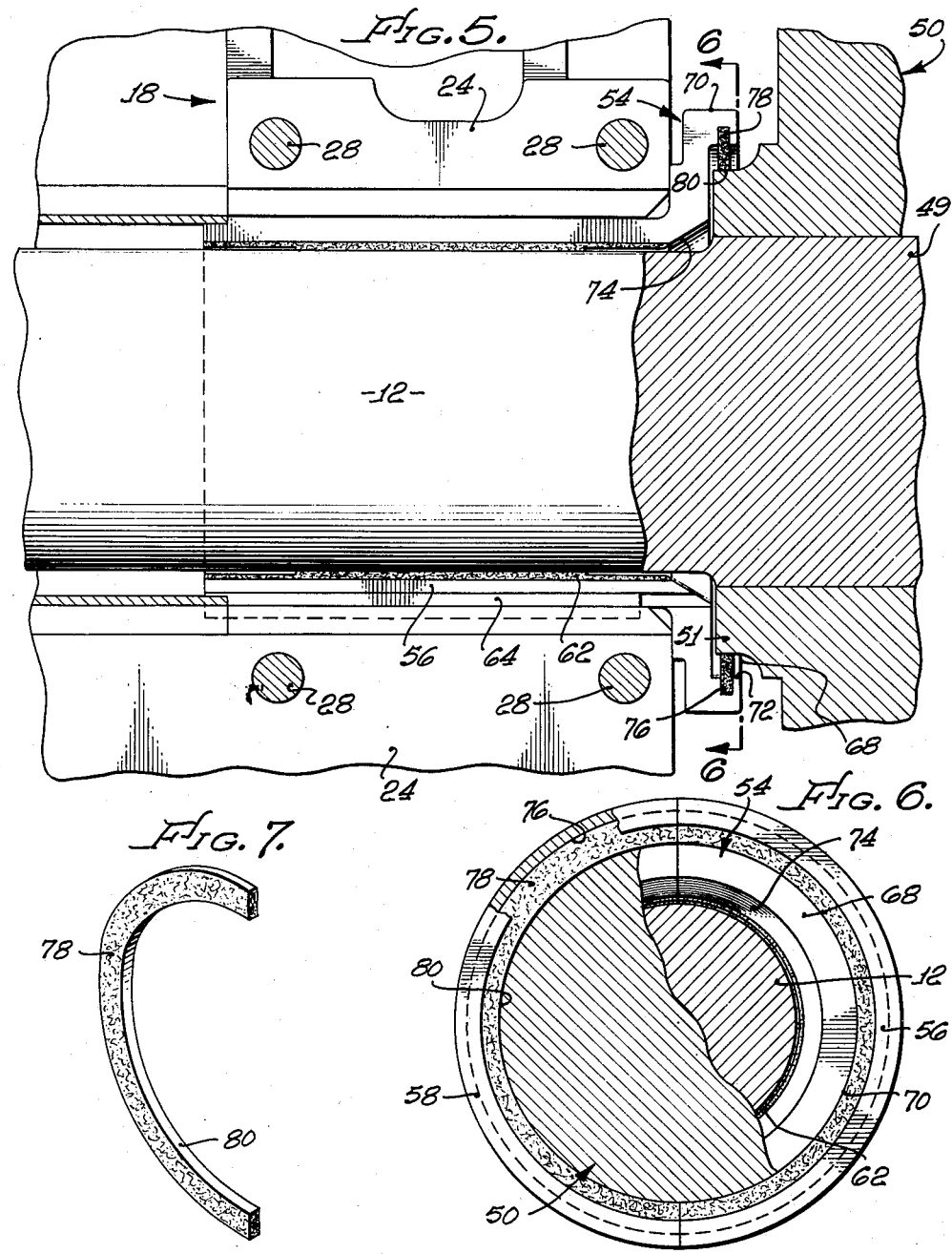

2,954,263
TRACTION MOTOR SUPPORT BEARING

Louis J. Kalny, 2707 Carlos Ave., Alhambra, Calif., assignor of fifty percent to John G. Wurtz, Jr., Alhambra, Calif.

Filed Mar. 11, 1959, Ser. No. 798,617

2 Claims. (Cl. 308—36.1)

This invention relates to improvements in bearings and more particularly to an improved traction motor support bearing adapted to be used at the commutator end of a locomotive traction motor mounted on a conventional axle.

Conventionally the traction motor support bearing mounted at the commutator end of a conventional locomotive traction motor is used in combination with a separate dust guard which holds suitable dust sealing means in place. This separate dust guard is secured to the conventional bearing by bolting it to a flange at one end thereof. This combination shortens the effective life of the bearing since the dust guard tends to loosen under operating conditions permitting frictional wear and the introduction of dust and other foreign matter into the area between the axle and bearing.

It is, therefore, an object of this invention to provide in a unitary structure a support bearing and dust guard to be used at the commutator end of a conventional traction motor which unitary structure overcomes the above mentioned disadvantages.

It is a further object of this invention to provide such a unitary structure which, in combination with a traction motor and locomotive truck assembly, is lubricated in such a manner so as to substantially reduce the probability of introducing foreign matter between the bearing surface and the axle.

It is a further object of this invention to provide a bearing structure which is economical of manufacture and which, in use, is long lived as compared to conventional bearings and dust guard structures.

Other objects and advantages of this invention will, it is believed, be readily apparent to those skilled in the art from the following detailed description of a preferred embodiment thereof when taken in connection with the accompanying drawings in which—

Fig. 1 is a perspective view partially exploded and partially broken away of my bearing as applied to a truck assembly.

Fig. 2 is a partial sectional view taken substantially along the line 2—2 of Fig. 1.

Fig. 3 is a side elevation of the bearing.

Fig. 4 is an exploded sectional view taken substantially along the line 4—4 of Fig. 3.

Fig. 5 is a partial sectional view taken substantially along the line 5—5 of Fig. 2.

Fig. 6 is a sectional view taken substantially along the line 6—6 of Fig. 5 and partially broken away.

Fig. 7 is a perspective view of a portion of the felt dust seal to be used in combination with the bearing shown in Fig. 3.

Referring now to the drawings, a truck assembly including a wheel 10, an axle 12 and a motor assembly 14 is indicated generally in Fig. 1. The motor, wheel and axle are conventional and have been described in detail in various publications, including a publication by the Electro-Motive Division of General Motors Corporation of October, 1958, P.L. No. M3900, Plate L3900–1.

The motor 14 is mounted on the axle 12 and carried by the body of the locomotive (not shown). The motor includes a pair of axle support assemblies indicated generally at 16 and 18 and a power gear 20. Secured to the axle 12 and operably engaging the power gear 20 is a main driving gear 22, conventionally referred to as a bull wheel. By this construction power generated by the motor 14 is transmitted to the wheel 10 through the gear 20, the bull wheel 22 and the axle 12.

The axle support assembly 16 is positioned adjacent the bull wheel end while the support assembly 18 is positioned adjacent the commutator end of the motor 14. These support assemblies each include a pair of complementary internally cylindrical clamping members 24 and 26. The clamping member 24 is carried by the motor 14 while the clamping member 26 is secured to its complementary member 24 as by bolts 28.

The axle 12 is rotatably mounted within the cylindrical opening formed by the joining of these complementary members. Between the clamping members 24 and 26 and the axle 12 there is mounted in each support assembly 16 and 18 a bearing. The bearing in the support assembly 16 is conventional and is suitably sealed to prevent dust and other foreign particles from entering the area between the internal bearing surface and the axle 12.

The axle 12 is lubricated by a conventional lubricator wick assembly indicated generally at 30. The wick assembly which is carried by the clamping member 26 includes a bearing cap 32, a wick 34 supported by a suitable spring loaded support member 36 and lubricant inlet and outlet ports 38 and 40. One end 42 of the wick projects into the lubricant carried within the reservoir area 44 of the lubricator wick assembly 30. The other end 46 has a surface 48 thereof curved to conform to the contour of the axle 12. By this construction lubricant is transmitted up the wick 34 to the axle 12 to lubricate the area between the axle and the bearing.

The bearing carried by the support assembly 18 at the commutator side of the motor 14 is adjacent the wheel 10. The end of the axle 12 is provided with an enlarged projecting shaft portion 49 which engages and is locked to the wheel 10. The wheel is provided with a projecting flange 50 having a reduced extending step 51 between the axle 12 and the outer periphery 52 of the flange 50. The structure thus far described is conventional and as such forms no part of the invention.

In accordance with the present invention a bearing structure 54 carried by the support assembly 18 is provided which cooperates with the flange 50 and step 51 to effectively prevent dust and other foreign matter from moving past the step to that portion of the axle 12 encircled by the bearing 54.

The bearing 54 includes a pair of complementary generally semi-cylindrical sleeve portions 56 and 58 which encircle the axle 12. The interior bearing surface 60 may be lined with what is known in the art as a white metal lining 62 to improve the antifriction qualities of the bearing.

The bearing 54 is locked between the clamping members 24 and 26 by a suitable key 64 carried by the keyways in the clamping member 24 and the bearing 54. By this construction the bearing may not rotate with respect to the motor 14.

One of the complementary cylindrical sleeve members 58 is provided with a lubricating window 66 through which the end 46 of the wick 34 projects so as to lubricate the axle 12.

One end 68 of the bearing 54 is provided with a flange 70. The flange 70 is provided with a counterbore or recess 72. The internal diameter of the recess is approximately equal to the external diameter of the flange 50 and is greater than the external diameter of the step 51. The internal juncture between the flange 70 and the cylindrical members 56 and 58 is partially broken away as at 74 to eliminate any contact between the axle 12 and the bearing 54.

Within the recess 72 the flange is provided with an annular groove 76 generally rectangular in transverse cross section. Within this groove there is carried a dust sealing means such as a flat disk or dust seal 78. The internal surface 80 of the dust seal rides on the step 51 of the flange 50. By this construction the flat disk, or other suitable sealing means, prevents dust and other foreign matter from passing from the roadbed into the bearing area between the lining 62 and axle 12.

In the operation of the device thus described, the motor 14 is clamped to the axle 12, the support member 18 being positioned adjacent the flange 50. The flange 70 of the bearing 54 projects beyond the end of the support member 18 and encircles the step 51. The sealing means 78 carried within the groove 76 rides on the step 51. Lubricant applied to the axle 12 by the wick 34, when the axle is rotating, moves along the bearing surface and outwardly against the sealing means 78. In practice it has been noted that lubricating fluid escapes principally in the contact zone between the sealing means 78 and the step 51. Since fluid is moving outwardly at this point, any dust which should make its way into this area is flushed out by the escaping lubricating fluid.

Having fully described my invention, it is to be understood that I do not wish to be limited to the detail set forth, but my invention is of the full scope of the appended claims.

I claim:
1. A traction motor support bearing comprising: a pair of complementary generally semi-cylindrical bearing members having complementary sleeve portions and flange portions, said bearing members cooperating to form a generally cylindrical bearing element having a central bore therethrough and a radially extending flange at one end thereof, said flange being provided with a counterbore coaxial of said central bore and a peripheral annular groove encircling said counterbore, said groove being adapted to carry dust sealing means.

2. A traction motor support bearing comprising: a pair of complementary semi-cylindrical bearing members having complementary sleeve portions and flange portions, said bearing members cooperating to form a generally cylindrical bearing element having a central bore therethrough and a radially extending flange at one end thereof; one of said sleeve portions being provided with a window; said flange being provided with a centrally positioned recess and a peripheral annular groove within said recess, said groove being adapted to carry dust sealing means.

References Cited in the file of this patent

UNITED STATES PATENTS

| | | |
|---|---|---|
| 2,194,493 | Buckius et al. | Mar. 26, 1940 |
| 2,353,436 | Binney | July 11, 1944 |
| 2,473,130 | Bauroth | June 14, 1949 |
| 2,498,520 | Blackmore | Feb. 21, 1950 |
| 2,742,864 | Enyart | Apr. 24, 1956 |